July 1, 1969   A. MILLER   3,452,503
PROCESS AND PRODUCT FOR CONFINING HYDROGEN GAS
Filed May 10, 1966
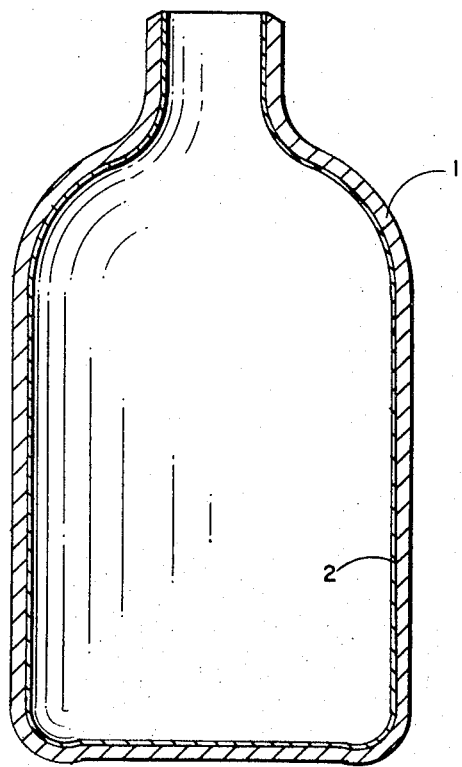
INVENTOR.
ARNOLD MILLER
BY Robert G. Rogers
ATTORNEY

United States Patent Office 3,452,503
Patented July 1, 1969

---

3,452,503
PROCESS AND PRODUCT FOR CONFINING
HYDROGEN GAS
Arnold Miller, Fullerton, Calif., assignor to
North American Rockwell Corporation
Filed May 10, 1966, Ser. No. 548,984
Int. Cl. B65b 29/00
U.S. Cl. 53—5                                    6 Claims

ABSTRACT OF THE DISCLOSURE

The invention is a hydrogen impermeable container formed of a metal selected from the group of magnesium, palladium and nickel which is coated on the container side with a layer of catalytic poisoning sulfide to prevent catalytic disassociation of hydrogen at the metal surface.

---

This invention relates to a process and structure for confining hydrogen gas and more specifically to a process for coating a surface with a sulfide containing composition for reducing hydrogen gas leakage there through.

Hydrogen is a difficult gas to contain in a metal enclosure for extended periods of time because on many metals such as nickel, magnesium, palladium, etc., hydrogen gas is catalytically disassociated into hydrogen atoms and absorbed into the surface. The hydrogen atom has a sufficiently small atomic radius so that it readily migrates through the lattice of the metal until it reaches the outer surface. On the outer surface the atoms recombine to form hydrogen gas. As a result, the performance of gas bearings using hydrogen is degraded because of the drop in pressure. The usefulness of hydrogen gas in other applications is also impaired by this atomic leakage problem.

Briefly, the present process and product overcomes the problem of containing hydrogen gas by forming a sulfide containing composition on the surface of the enclosing container.

Oxide, nitride and fluoride layers or their analogs can be formed by the process described herein, but such layers are believed not to change the surface reactivity of the metal of the container involved in such a way to function as catalyst poisons and thereby prevent the formation of hydrogen atoms.

Therefore, it is an object of this invention to provide a process for forming a sulfide composition on a surface for preventing passage of hydrogen gas through the surface by catalytic deactivation.

Still another object of the invention is to provide structure comprising a layer of a sulfide containing composition chemical bonded to a metal surface for preventing loss of hydrogen gas through the surface by catalytic deactivation.

A further object of the invention is to provide a product and a process for forming the product for preventing hydrogen gas from passing through a confining container.

These and other objects of this invention will become more apparent in connection with the following drawing of which:

The figure is a cross-sectional view of container having a sulfide containing composition on the inner surface thereof.

Referring now to the figure, wherein is represented one embodiment of the present invention, a container 1 is illustrated on which a layer 2 is formed on its inner surface. The layer 2 is at least one molecule thick and is comprised of a metal sulfide having molecular structure which may be represented as follows:

where S represents the sulfur atom and M represents the metal of the surface, which chemically reacts with the sulfur atom to form the metal sulfide layer.

In another embodiment, the layer may be a metal sulfide having an added chemical group such as a straight-chain alkyl group, R. R, in an appropriate situation, may be a butyl group $C_4H_9$, hexyl group $C_6H_{13}$, lauryl group $C_{12}H_{25}$, stearyl group $C_{18}H_{37}$, etc. The layer may be represented as follows:

As apparent from the representation, there is also Van der Waal bonding between adjacent groups to yield added tenacity to the surface layer. Surface features such as hydrophobicity or oleophobicity may be imparted.

In order to form layer 2, a reactive sulfur containing gas is introduced into the container or into a container housing a surface upon which a coating is desired. The surface is maintained at a temperature sufficient to cause reaction of the sulfur containing compound with the surface metal atoms. Preferably, the temperature is maintained in the range of between about 75° and about 200° centigrade.

The following examples illustrate the process steps and apparatus for forming a chemically bonded layer to a metallic surface to prevent passage through the surface of hydrogen gas by catalytic deactivation.

EXAMPLE 1

A nickel metal container adapted to enclosing hydrogen gas was placed within a radiofrequency heating coil. The inner area of the container was maintained within the temperature range of from 100° to 150° centigrade during the formation of the sulfide layer. Hydrogen sulfide gas $H_2S$ was introduced into the container and permitted to remain in the container for a period of ten minutes, at which time it was evacuated and the temperature reduced to ambient. The time period was sufficient to permit the sulfide to chemically bond to the nickel metal of the surface to form at least a one molecule thick layer of nickel sulfide. The thickness of the layer was subsequently determined on reference panels by means of optical interference techniques.

After the container was purged with hydrogen gas and filled with hydrogen gas, it was determined by means of standard spectrometer techniques that hydrogen loss by migration was stopped.

EXAMPLE 2

The above process of Example 1 was repeated with magnesium and palladium containers with similar results. It is believed that the process can be used to produce a sulfide containing composition on any metal which has a catalytic effect on hydrogen gas, allowing diffusional loss by atom formation.

EXAMPLE 3

The process of Example 1 was repeated with the thio-acid, $C_4H_9SH$, as the gas. The results were substantially the same as before, forming the corresponding metal thio-ether. No hydrogen gas losses by diffusion were detected over extended periods of time.

In several tests made during the storage of hydrogen gas for an extended period of time, e.g., one week, hydrogen leakage levels were measured continuously with a sensitive mass spectrometer, following the parent $M/e2$ peak. No hydrogen diffusion was observed from the surface treated containers within the sensitivity of the instrument. In similar or the same containers which had no surface treatment definite indication of hydrogen diffusion was obtained.

Another test conducted over a six to eight month period involving an evacuated metering tube which was periodically read with a mass spectrometer. Measurements were conducted and no hydrogen peaks indicative of diffusion were observed in the surface coated structure.

Tests were also conducted to determine whether or not increases in the pressure of the hydrogen gas caused leakage through the added layer. It was determined that the layer would prevent leakage within the limits of the pressure-bearing capacity of the particular container involved.

Although the invention has been described and illustrated in detail, it is to be understood that the same is by way of illustration and example only, and is not to be taken by way of limitation; the spirit and scope of this invention being limited only by the terms of the appended claims.

I claim:
1. A process for confining hydrogen gas in a metal container, said metal selected from the group consisting of nickel, magnesium and palladium, comprising the steps of exposing the inside surface of the container to a catalyst poisoning sulfide and reacting the sulfide with said metal, purging the inside of said container with a hydrogen gas, and placing hydrogen gas in said container for storage.

2. The process according to claim 1 wherein said sulfide is a metal thioether wherein a butyl, hexyl, lauryl, or stearyl group is bonded to the sulfur.

3. A hyddrogen impermeable container formed of a metal selected from the group consisting of magnesium, palladium and nickel, and having a coating on the hydrogen containing side thereof comprising a layer at least one molecule thick of a catalyst poisoning sulfide of a metal selected from the group consisting of magnesium, palladium and nickel, whereby catalytic disassociation of hydrogen at the metal surface is prevented.

4. A method of preventing catalytic disassociation of hydrogen at the surface of a metal selected from the class consisting of magnesium, palladium and nickel comprising the steps of:
   forming a catalyst poisoning sulfide coating at least one molecule thick on the hydrogen exposed surface of the metal; and
   exposing the coated surface to molecular hydrogen.

5. A process for forming a hydrogen impermeable container comprising the steps of:
   forming a container of a metal selected from the group consisting of magnesium, palladium and nickel;
   heating the container in a temperature range of from 75 to 200° C.;
   exposing the hydrogen containing surface of said heated container to a gas selected from the group consisting of hydrogen sulfide and straight chain alkyl sulfides of the form RSH wherein the alkyl group R has from 4 to 18 carbon atoms in the alkyl chain, for a time sufficient to form a catalyst poisoning metal sulfide layer on the surface at least one molecule thick.

6. A process as defined in claim 5 wherein the alkyl group is selected from the group consisting of butyl, hexyl, lauryl, and stearyl.

References Cited
UNITED STATES PATENTS

| | | | |
|---|---|---|---|
| 2,245,561 | 6/1941 | Nelson et al. | 148—6.3 X |
| 2,399,019 | 4/1946 | Grinter et al. | 148—6.3 X |
| 2,841,501 | 7/1958 | Murphy | 148—6.24 |
| 3,248,235 | 4/1966 | Pryor et al. | 148—6.24 X |

RALPH S. KENDALL, *Primary Examiner.*

U.S. Cl. X.R.

53—7; 117—97; 148—6.24; 220—3, 64; 206—6